United States Patent
Roh (10) Patent No.: US 7,929,823 B2
(45) Date of Patent: Apr. 19, 2011

(54) DEVICE AND METHOD FOR DISPLAYING IMAGES

(75) Inventor: Dong-hyun Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1197 days.

(21) Appl. No.: 11/594,086

(22) Filed: Nov. 8, 2006

(65) Prior Publication Data

US 2007/0110399 A1    May 17, 2007

(30) Foreign Application Priority Data

Nov. 17, 2005  (KR) .................. 10-2005-0110309

(51) Int. Cl.
*H04N 9/80* (2006.01)
(52) U.S. Cl. ....................................... 386/241; 386/348
(58) Field of Classification Search ........... 386/200.241, 386/343, 344, 348
See application file for complete search history.

(56) References Cited

U.S. PATENT DOCUMENTS

2002/0133486 A1  9/2002 Yanagihara et al.

FOREIGN PATENT DOCUMENTS

| CN | 1233822 A | 11/1999 |
|---|---|---|
| CN | 1787104 A | 6/2006 |
| JP | 2003-030675 A | 1/2003 |
| JP | 2005-080027 A | 3/2005 |
| KR | 10-2002-0069724 A | 9/2002 |
| KR | 10-2004-0071455 A | 8/2004 |
| KR | 10-2005-0017061 A | 2/2005 |
| WO | 2005/069172 A1 | 7/2005 |

*Primary Examiner* — Huy T Nguyen
(74) *Attorney, Agent, or Firm* — Sughrue Mion, PLLC (57) ABSTRACT

A device and a method for displaying images are provided. The device includes an input unit, a frame searching unit, a thumbnail selection unit, and a video processing unit. The input unit receives a signal for moving an image playback location along a time axis by an interval from a current playback point of images being played back. The frame searching unit sets a skip section ranging from a skip start point to a skip end point, in response to the received signal. The thumbnail selection unit selects a plurality of thumbnail images existing in the skip section. The video processing unit displays the selected thumbnail images.

32 Claims, 9 Drawing Sheets

DEVICE AND METHOD FOR DISPLAYING IMAGES

CROSS-REFERENCE TO RELATED APPLICATIONS

This application claims priority from Korean Patent Application No. 10-2005-0110309 filed on Nov. 17, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to displaying images, and more particularly, to displaying images based on a playback location movement technology.

2. Description of the Related Art

Recently, with the development of digital technologies, digitization of broadcasting is actively being conducted. Digital broadcasting has advantages in that it can transmit high-quality broadcast programs and data such as program guide information, and enables a bidirectional service compared to conventional analog broadcasting.

Currently, digital broadcasting is being provided through media, such as satellites, terrestrial waves, and cables. In digital satellite broadcasting, European Digital Video Broadcasting-Satellite (DVB-S) has become the standard. In digital terrestrial broadcasting, American Advanced Television Systems Committee (ATSC) has become the standard. In digital cable broadcasting, European Digital Video Broadcasting-Cable (DVB-C) TeleVision (TV), American OpenCable, and Japanese Integrated Services Digital Network (ISDB-C) have become the standards.

For digital broadcasting, a broadcasting station produces broadcast programs using digital equipment, compresses generated digital broadcasting signals using a predetermined compression method, and multiplexes and transmits Audio/Video (A/V) signals and data necessary for constituting an electronic program guide (EPG).

Digital broadcasting signals transmitted from the broadcasting station are received by digital broadcasting receivers in individual homes. A digital broadcasting receiver generally outputs a broadcasting program according to the following data processing process. That is, when a user selects a specific channel using a remote control device, such as a remote controller, the digital broadcasting receiver is tuned to the frequency of the selected channel, and receives digital broadcasting signals within a corresponding frequency band. Thereafter, the received digital broadcasting signals are demodulated and demultiplexed, and audio signals and video signals, which are obtained through the division of demultiplexed signals, are decoded and output, so that voice and image signals, which correspond to the broadcasting program of the channel selected by the user, are output.

A related art digital broadcasting receiver may store digital broadcasting signals received through a tuner, and display the stored broadcasting signals according to the user's command. In this case, the user can select a playback location using a playback location movement function.

The playback location movement function is advantageous in that movement through a long section is made at once. However, it is disadvantageous in that the user cannot check the details of the skipped section.

Furthermore, the related art digital broadcasting receiver has the characteristic of processing digital broadcasting signals. For this reason, it takes a predetermined delay time for an image at a moved point is decoded and output when the movement of a playback location is initiated. The delay time is as short as two seconds to as long as three to four seconds, so that a blank screen is output onto the screen of the digital broadcasting receiver during the delay time. Accordingly, problems occur in that the user is visually dissatisfied and cannot immediately check an image at a point to which movement is to be made.

Accordingly, when the movement of a playback location is initiated, a device and a method that enable checking of the details of skipped sections and further facilitates searches for the details of the skipped section are needed.

SUMMARY OF THE INVENTION

The present invention provides a device and a method for displaying images, which, when the movement of a playback location is initiated, extract a plurality of still images in the direction in which movement is to be made on the basis of a current playing location, and displays the extracted still images using a thumbnail method, thus allowing a user to check the details of a skipped section.

According to an aspect of the present invention, there is provided a device for displaying images, the device including an indexing table generation unit generating an indexing table for images that are being played back; an input unit receiving a signal for moving an image playback location along a time axis by a predetermined interval; a frame searching unit setting a skip start point and a skip end point with reference to the indexing table, in response to the received signal; a thumbnail selection unit selecting a plurality of thumbnail images existing a skip section ranging from the skip start point to the skip end point with reference to the indexing table; and a video processing unit displaying the selected thumbnail images.

According to another aspect of the present invention, there is provided a method of displaying images, the method including generating an indexing table for images that are being played back; receiving a signal for moving a image playback location along a time axis by a predetermined interval; setting a skip start point and a skip end point with reference to the indexing table, in response to the received signal; selecting a plurality of thumbnail images existing in a skip section ranging from the skip start point to the skip end point with reference to the indexing table; and displaying the selected thumbnail images.

BRIEF DESCRIPTION OF THE DRAWINGS

The above and other aspects of the present invention will be more clearly understood from the following detailed description of exemplary embodiments taken in conjunction with the accompanying drawings, in which.

DESCRIPTION OF EXEMPLARY EMBODIMENTS

Aspects of the present invention and methods of achieving the same will be apparent with reference to exemplary embodiment described in detail later in conjunction with the accompanying drawings.

However, the present invention is not limited to the exemplary embodiment disclosed below, but may be implemented in various ways. Furthermore, the exemplary embodiment is provided to complete the disclosure of the present invention, and to fully notify those skilled in the art of the scope of the present invention. The present invention is defined only by the appended claims.

The present invention is described hereinafter with reference to flowchart illustrations of user interfaces, methods, and computer program products according to the exemplary embodiment of the invention. It will be understood that each block of the flowchart illustrations, and combinations of blocks in the flowchart illustrations, can be implemented using computer program instructions. These computer program instructions can be provided to a processor of a general-purpose computer, a special-purpose computer, or other programmable data processing device to produce a machine, such that the instructions, which execute via the processor of the computer or other programmable data processing device, create means for implementing the functions specified in the flowchart block or blocks.

These computer program instructions may also be stored in a computer-usable or computer-readable memory that can direct a computer or other programmable data processing device to function in a particular manner, such that the instructions stored in the computer usable or computer-readable memory produce a manufactured article including instruction means that implement the functions specified in the flowchart block or blocks.

The computer program instructions may also be loaded into a computer or other programmable data processing device to cause a series of operational operations to be performed on the computer or other programmable device to produce a computer-implemented process such that the instructions that execute on the computer or other programmable device provide operations for implementing the functions specified in the flowchart block or blocks.

Further, each block of the flowchart illustrations may represent a module, a segment, or a portion of code, which comprises one or more executable instructions for implementing the specified logical function(s). It should also be noted that in some alternative implementations, the functions noted in the blocks may occur out of this order. For example, two blocks shown in succession may in fact be executed substantially concurrently, or the blocks may sometimes be executed in reverse order, depending upon the functionality involved.

First, a device for displaying images according to an exemplary embodiment of the present invention is described with reference to FIGS. 1 to 4F.

Figure 1:
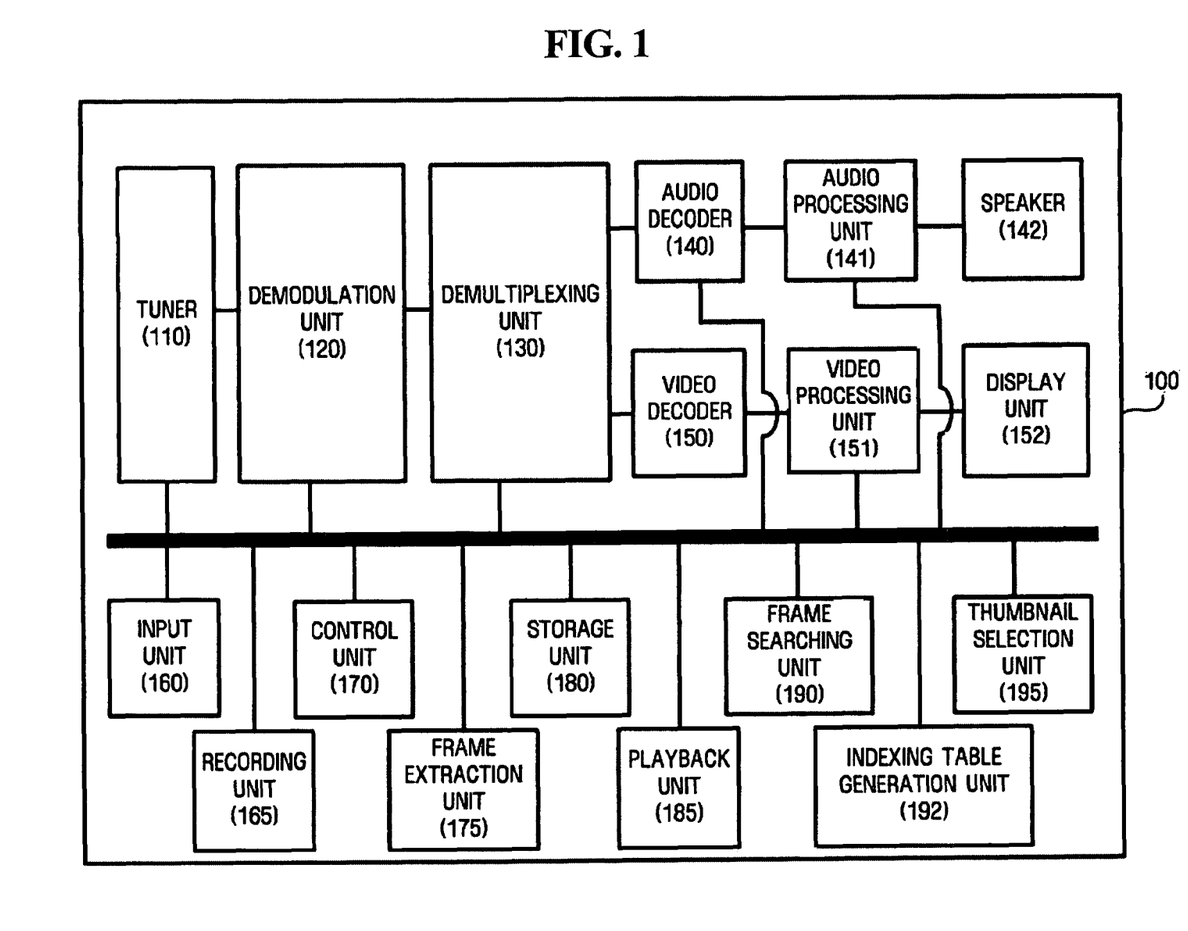
FIG. 1 is a block diagram showing the construction of a device for displaying images according to an exemplary embodiment of the present invention.
Figure 2:
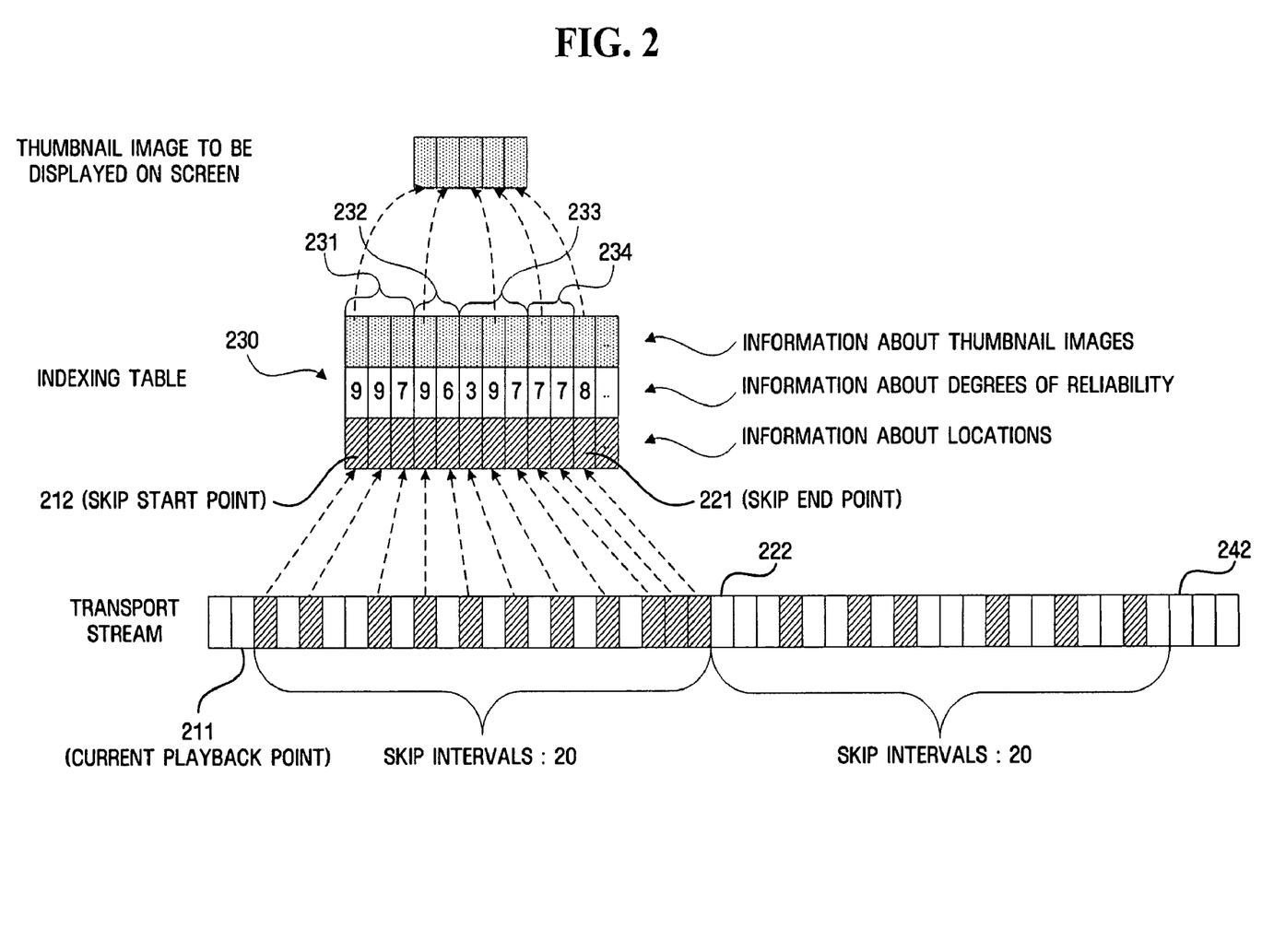
FIG. 2 is a diagram showing a relationship between a video stream, an indexing table, and thumbnail images displayed on a screen according to an exemplary embodiment of the present invention.

FIG. 1 is a block diagram showing a construction of a device for displaying images according to an exemplary embodiment of the present invention. FIG. 2 is a diagram showing a relationship between a video stream, an indexing table, and thumbnail images displayed on a screen according to an exemplary embodiment of the present invention. FIGS. 3A to 3D are diagrams showing examples of disposition of thumbnail images according to an exemplary embodiment of the present invention. FIGS. 4A to 4F are diagrams showing examples of pictures displayed on the device for displaying images according to the exemplary embodiment of the present invention.

The image display device according to the exemplary embodiment of the present invention may be implemented as a digital device. In this case, a digital device is a device having digital circuitry for processing digital data, and is exemplified by a computer, a printer, a scanner, a pager, a digital camera, a facsimile, a digital copying machine, a digital home appliance, a digital telephone, a digital projector, a home server, a digital video recorder, a digital broadcasting receiver, a digital satellite broadcasting receiver, a set-top box, a Personal Digital Assistant (PDA), and a mobile phone.

The image display device 100 according to an exemplary embodiment of the present invention, for example, receives and stores a Moving Picture Experts Group-2 (MPEG-2) Transport Stream (TS) stream in which video data, which is compressed using an MPEG-2 method, and audio data, which is compressed using an Audio Compression-3 (AC-3) method, are included, and provides A/V signals corresponding to a broadcast program desired by a user.

In more detail, the image displaying device 100, as shown in FIG. 1, includes a tuner 110, a demodulation unit 120, a demultiplexing unit 130, an audio decoder 140, a video decoder 150, a audio processing unit 141, an video processing unit 151, an input unit 160, a control unit 170, a recording unit 165, a storage unit 180, a frame extraction unit 175, an indexing table generation unit 192, a frame searching unit 190, a thumbnail selection unit 195, and a playback unit 185.

The input unit 160 receives commands from the user. Although not shown, the input unit 160 includes a plurality of function keys, for example, a power key, channel change keys, volume adjustment keys, direction keys, a recording key, a playback key, and playback location movement keys. In this case, the playback location movement keys are keys for performing displaying from a frame at a location reached by skipping a predetermined number of frames from a frame that is currently being played back. The playback location movement keys include a first playback location movement key for performing section movement from the frame currently being played back in a forward direction with respect to the flow of time, and a second playback location movement key for moving from the frame currently being played back in a reverse direction with respect to the flow of time.

When the keys included in the input unit 160 are pressed by the user, predetermined key signals are generated. The generated key signals are provided to the control unit 170. For example, when the recording key is pressed, a corresponding key signal is generated and is then provided to the control unit 170. Furthermore, the respective keys included in the input unit 160 may be constructed as separate keys or may be integrally constructed. For example, of the direction keys, upward and downward direction keys may include channel up and down functions, respectively, and leftward and rightward direction keys may include volume down and up functions, respectively.

The control unit 170 controls the elements of the image display device 100 in response to key signals provided by the input unit 160. For example, when a user selects a specific channel through the input unit 160, the control unit 170 transfers a command, which is used to tune to the frequency of the channel selected by the user, to the tuner 110. In another example, when the recording key is pressed, the control unit 170 controls the recording unit 165 and enables a demodulated MPEG-2 TS stream to be stored in the storage unit 180.

The tuner 110 is tuned to the reception band of the channel selected by the user, converts received signal waves into Intermediate Frequency (IF) signals, and provides the IF signals to the demodulation unit 120.

The demodulation unit 120 demodulates digital signals provided by the tuner 110, and provides data, having an MPEG-2 TS format, to the demultiplexing unit 130.

When a recording command is input through the input unit 160, the recording unit 165 stores the MPEG-2 TS stream, which is demodulated through the demodulation unit 120, to the storage unit 180.

The storage unit 180 stores the demodulated MPEG-2 TS stream, and an indexing table 230 generated by the indexing table generation unit 192, which will be described later. The storage unit 180 may be implemented using at least one of non-volatile memory devices, such as a cache memory, a Read Only Memory (ROM), a Programmable ROM (PROM), an Erasable Programmable ROM (EPROM), an Electrically Erasable Programmable ROM (EEPROM) and a Flash memory, volatile memory devices, such as a Random Access Memory (RAM), and a storage medium, such as a Hard Disk Drive (HDD), but is not limited thereto.

The frame extraction unit 175 extracts I-frames from the MPEG-2 TS stream stored in the storage unit 180, and provides the extracted I-frames to the indexing table generation unit 192.

The indexing table generation unit 192 creates the indexing table 230 using the I-frames extracted by the frame extraction unit 175.

For this purpose, the indexing table generation unit 192 first sets the degrees of reliability for the extracted I-frames using a predetermined method. In this case, the term 'the degree of reliability' refers to the extent to which the respective I-frames can effectively transfer the details of images. The range of the degree of reliability for each I-frame may be set to, for example, 0 to 10, and various methods may be employed as the method of setting the degrees of reliability for the I-frames.

For example, detection of the number of persons from a corresponding I-frame is performed, and the degree of reliability may be set according to the number of detected persons. In more detail, the possibility of the presence of a leading actor increases in inverse proportion to the number of persons present in a scene, so that the degree of reliability is set to a high value in inverse proportion to the number of detected persons. In contrast, the possibility of the presence of supporting actors increases in proportion to the increase of the number of persons present in a scene, so that the degree of reliability is set to a low value in proportion to the increase of the number of detected persons. In another example, the degree of reliability may be set by detecting whether a scene has changed.

In this manner, when the degrees of reliability are set for the respective I-frames, the indexing table generation unit 192 generates thumbnail images corresponding to the respective I-frames. In this case, for I-frames each having a degree of reliability, for example, above 5, the indexing table generation unit 192 generates thumbnail images corresponding to the respective I-frames. In another example, for all of the I-frames extracted by the frame extraction unit 175, thumbnail images corresponding to the respective I-frames may be generated.

Thereafter, the indexing table generation unit 192 generates the indexing table 230, shown in FIG. 2, by generating a table containing information about the locations, the degrees of reliability, and thumbnail images of corresponding I-frames. The indexing table 230 generated using the above-described method is stored in the storage unit 180.

When a playback location movement key is pressed, the frame searching unit 190 first determines whether the same playback location movement key has been pressed within a predetermined time, for example, three seconds.

If, as a result of the determination, the same playback location movement key is determined not to have been pressed again within three seconds, the frame searching unit 190 sets the start point (hereinafter referred to as a 'skip start point') and end point (hereinafter referred to as 'skip end point') of a section (hereinafter referred to as a 'skip section') to be skipped by predetermined skip interval with reference to the location information of the indexing table 230. In this case, the term 'skip interval' refers to the number of frames in the transport stream, which can be skipped whenever the playback location movement key is pressed. For example, the fact that the skip interval is set to 20 implies that a setting is made such that 20 frames are skipped from a frame, which is currently being played back, whenever a playback location movement command is executed once.

In other words, the frame searching unit 190 sets the location of an I-frame closest to the location of a frame, which is currently being played back, for a skip start point with reference to the location information of the indexing table 230. Thereafter, the frame searching unit 190 sets the location of an I-frame closest to a frame at a location reached by skipping the predetermined skip interval from the location of a frame, which is currently being played back, for a skip end point with reference to the location information of the indexing table 230.

In this case, it is preferred, but not necessary, that the skip start point and the skip end point are set to locations selected from among the locations of frames that exist in a direction conforming to a movement direction determined by the pressed playback location movement key. For example, when the first playback location movement key is pressed, the frame searching unit 190 sets respective frames, which are selected from among frames existing in a forward direction with respect to the frame that is currently being played back, for the skip start point and the skip end point. In contrast, when the second playback location movement key is pressed, the frame searching unit 190 sets respective frames, which are selected from among frames existing in a backward direction with respect to the frame that is currently being played back, for the skip start point and the skip end point.

A detailed description thereof is given with reference to FIG. 2 below.

For the convenience of description, it is assumed that the skip section is set such that 20 frames are skipped whenever the playback location movement key is pressed.

In FIG. 2, when the first playback location movement key is pressed while a No. 1 frame 211 is being played back, the frame searching unit 190 sets the location of an I-frame 212, having information about a location closest to the location of the No. 1 frame 211 that belongs to frames existing in a forward direction on the basis of the location of the No. 1 frame 211, for a skip start point with reference to the location information of the indexing table 230. Thereafter, the frame searching unit 190 sets the location of an I-frame 221, which is closest to a No. 22 frame 222, for a skip end point with reference to the location information of the indexing table 230.

Meanwhile, when the same playback location movement key is successively pressed, the frame searching unit 190 adaptively sets the skip start point and the skip end point according to the number of presses. In more detail, when the playback location movement key is pressed, the frame searching unit 190 determines whether the same playback movement key is pressed again within the predetermined time, for example, within three seconds.

If, as a result of the determination, the same playback location movement key is determined to have been pressed again within three seconds, the frame searching unit 190 resets the skip end point. That is, the frame searching unit 190 sets the location of an I-frame that is closest to the frame at a location skipped by the numbers of frames corresponding to twice the skip interval from the location of a frame currently being played back, for the skip end point. In more detail, the location of an I-frame that is closest to a frame at a location skipped by forty frames from the No. 1 frame, is set for the skip end point in FIG. 2.

Information about the skip start point and the skip end point set in this manner is provided to the thumbnail selection unit 195, which will be described later. Furthermore, information about the skip end point is provided to the playback unit 185, which will be described later.

The thumbnail selection unit 195 selects a plurality of thumbnail images from among frames existing in the skip section that ranges from the skip start point to the skip end point, with reference to the indexing table 230. In this case, the number of selected thumbnail images is equal to the maximum number of thumbnail images that can be displayed through the display unit 152. In this case, the maximum number of thumbnail screens may be fixed regardless of the size of the skip section or may be adaptively changed depending on the size of the skip section.

For example, if the number of thumbnail images is fixed to five, the thumbnail selection unit 195 selects five thumbnail images from among frames that exist within the skip section, regardless of the size of the skip section. In another example, in the case where the size of the skip section is changed, for example, in the case where the same playback location movement key is successively pressed twice and, thereby, the skip section is twice the predetermined skip interval, the thumbnail selection unit 195 can set the number of thumbnail images to a value greater than five. A description of the case where the number of extracted thumbnail images is defined is given as an example below.

A process of selecting thumbnails is described in more detail with reference to FIG. 2 below.

After information about the skip start point and the skip end point has been provided from the frame searching unit 190, the thumbnail selection unit 195 selects frames, which exist within a section ranging from the skip start point to immediately before the skip end point frame, from the indexing table 230, and divides them into a plurality of frame groups. In this case, it is preferred, but not necessary, that the number of frame groups be less than a predetermined number of thumbnail images to be displayed by one. For example, in the case where the predetermined number of thumbnail images to be displayed is five, it is preferred, but not necessary, that the frames, which exist within a section ranging from the skip start point right prior to skip end point frame, be divided into four groups 231, 232, 233 and 234, as shown in FIG. 2.

Furthermore, it is preferred, but not necessary, that each of the frame groups includes a minimum number of frames, for example, one or more I-frames. Furthermore, it is preferred, but not necessary, that the difference between the number of frames, which are included in a frame group, and the number of frames, which are included in any of other frame group, be equal to or less than one. For example, in the case where the frames that exist within an interval ranging from the skip start point to immediately before the skip end point are divided into the first frame group 231, the second frame 232, the third frame group 233 and the fourth frame group 244, as shown in FIG. 2, it is preferred, but not necessary, that the first, second, third and fourth frame groups 231, 232, 233 and 234 respectively include three, two, three and two I-frames. That is, the differences between the number of I-frames, which are included in the first frame group 231, and the number of I-frames, which are included in any of the second, third and fourth frame groups, are equal to or less than one.

Thereafter, the thumbnail selection unit 195 selects the thumbnail image of an I-frame, which is the frame of a skip end point, and the thumbnail images of I-frames, each of which is included in a respective frame group and has the highest degree of reliability in the respective frame group, as thumbnail images to be displayed through the display unit 152. In the case where I-frames having the same degree of reliability exist within the same frame group, the thumbnail selection unit 195 selects the thumbnail image of the I-frame that is closest to the I-frame of the skip start point as a thumbnail image to be displayed through the display unit 152. In another example, the thumbnail image of the I-frame closest to the I-frame of the skip end point may be selected. In a further example, the thumbnail image of an arbitrary I-frame, which belongs to I-frames having the same degree of reliability, may be selected as a thumbnail image to be displayed through the display unit 152.

Figure 3A:
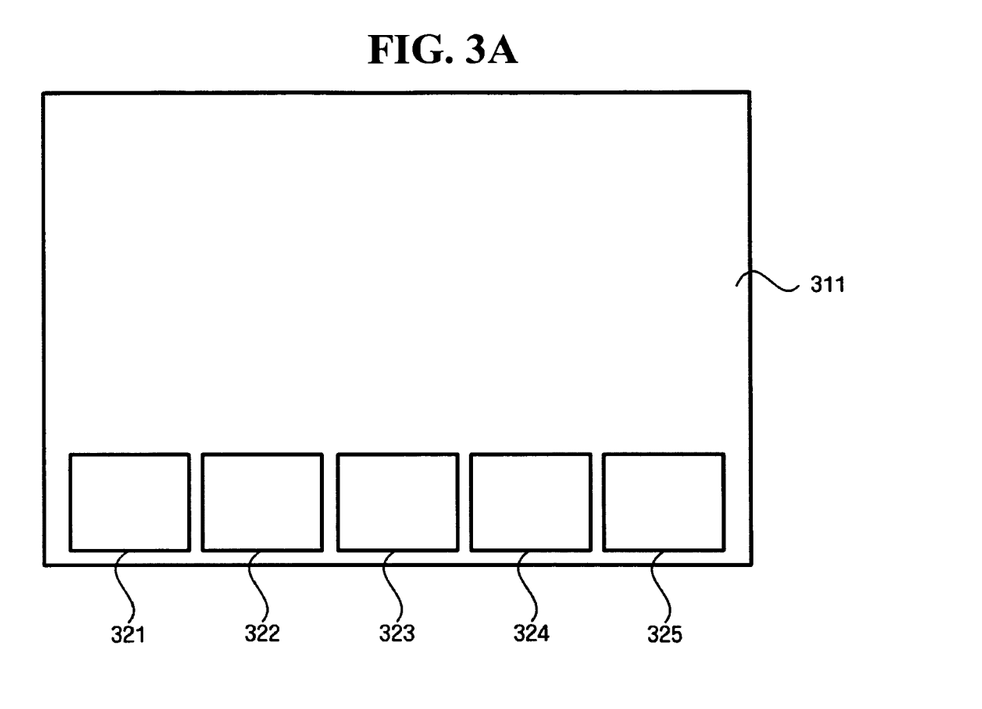
FIGS. 3A to 3D are diagrams showing examples of the disposition of thumbnail images on the device for displaying images according to the exemplary embodiment of the present invention.
Figure 3B:
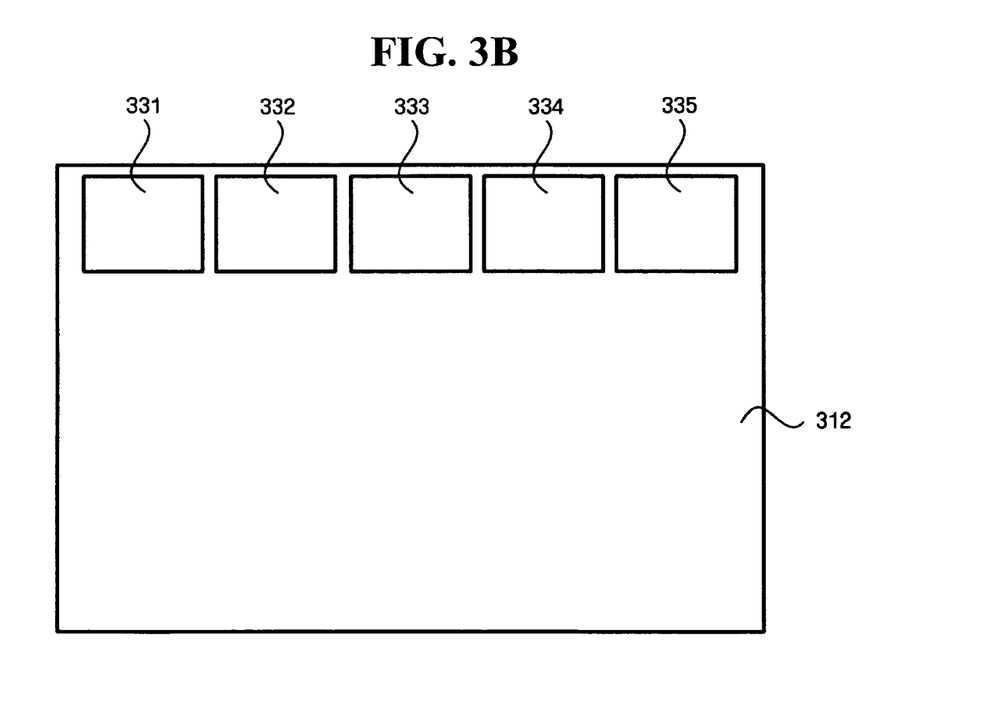
Figure 3C:
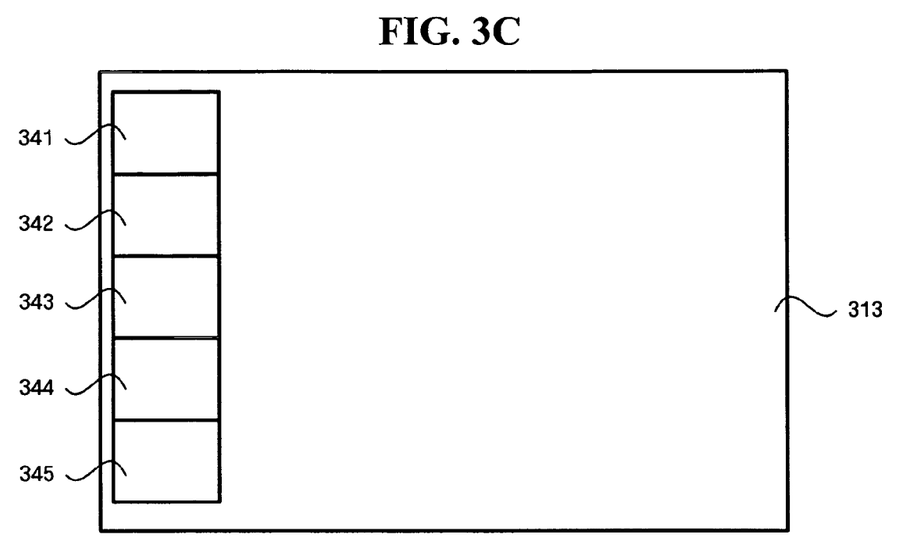
Figure 3D:
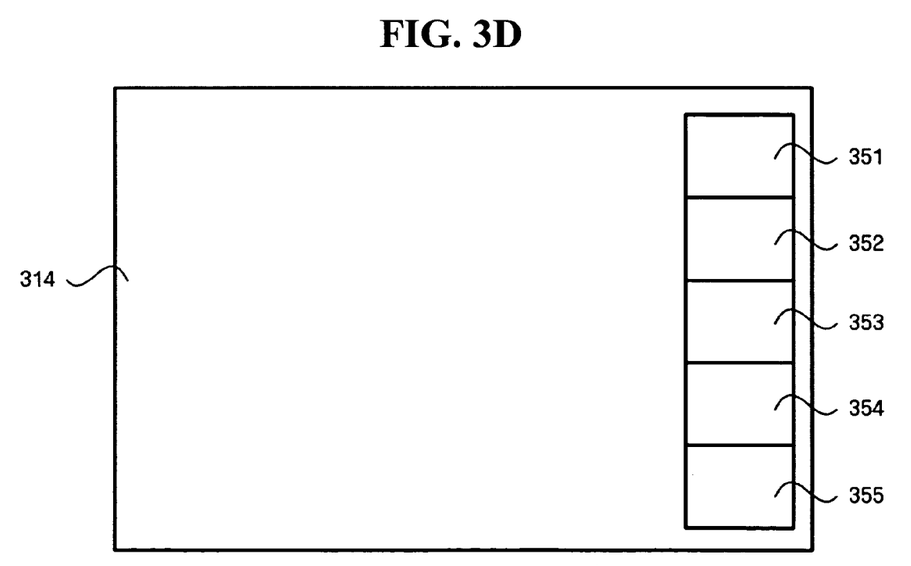

In this manner, when a thumbnail image to be displayed through the display unit 152 is selected, the video processing unit 151 disposes the selected thumbnail image at a designated location and displays it through the display unit 152. In this case, the thumbnail image may be disposed at one of various locations. FIGS. 3A to 3D show various examples of the disposition of thumbnail images. FIG. 3A shows thumbnail images that are disposed in the lower end portion of a screen in a line, and FIG. 3B shows thumbnail images that are disposed in the upper end portion of the screen in a line. FIGS. 3C and 3D show thumbnail images that are disposed the respective left and right end portions in a line. Although, in the above-described examples, the thumbnail images are disposed in a line, it is not essential to dispose the thumbnail images in a line, and the thumbnail images may be disposed in different ways.

Meanwhile, when the playback location movement key is pressed, the playback unit 185 sequentially reads transport stream data, which has been stored in the storage unit 180, from the transport stream data of the skip end point, and provides the read data to the demultiplexing unit 130.

The demultiplexing unit 130 separates the compressed audio data and the compressed video data from the input MPEG-2 TS stream, and supplies the separated audio and video data to the audio decoder 140 and the video decoder 150, respectively.

The audio decoder 140 decodes the input audio data, and supplies the decoded audio data to the audio processing unit 141.

The audio processing unit 141 performs a predetermined audio signal processing on the input audio data, and then outputs audio through an amplifier.

The video decoder 150 decodes the video data and supplies the decoded video data to the video processing unit 151.

The video processing unit 151 displays the input video image data and thumbnail images through the display unit 152 while overlapping them. For example, when, in the screen shown in FIG. 4A, the playback location movement key (not shown) is pressed, the video processing unit 151, as shown in FIG. 4B, displays thumbnail images 321, 322, 323, 324 and 325, which are extracted from the skip section, through the display unit 152. Thereafter, when decoding is sequentially completed from the transport stream data of the skip end point, a decoded image 325, as shown in FIG. 4C, is displayed through the display unit 152 while overlaying the thumbnail images 321, 322, 323, 324 and 325.

Hereafter, a method of displaying images according to an exemplary embodiment of the present invention is described in detail with reference to FIGS. 4A to 5. FIG. 5 is a flowchart illustrating a data processing process in the image display device 100 according to an exemplary embodiment of the present invention.

For the convenience of description, it is assumed that an MPEG-2 TS stream is stored in the storage unit 180 and is played back.

The frame extraction unit 175 extracts I-frames from the demodulated MPEG-2 TS stream.

For the I-frames extracted by the frame extraction unit 175, the indexing table generation unit 192, generates the indexing table 230, including information about the locations, thumbnail images, and the degrees of reliability of respective I-frames. Thereafter, the indexing table generation unit 192 stores the indexing table 230 in the storage unit 180.

Figure 4A:
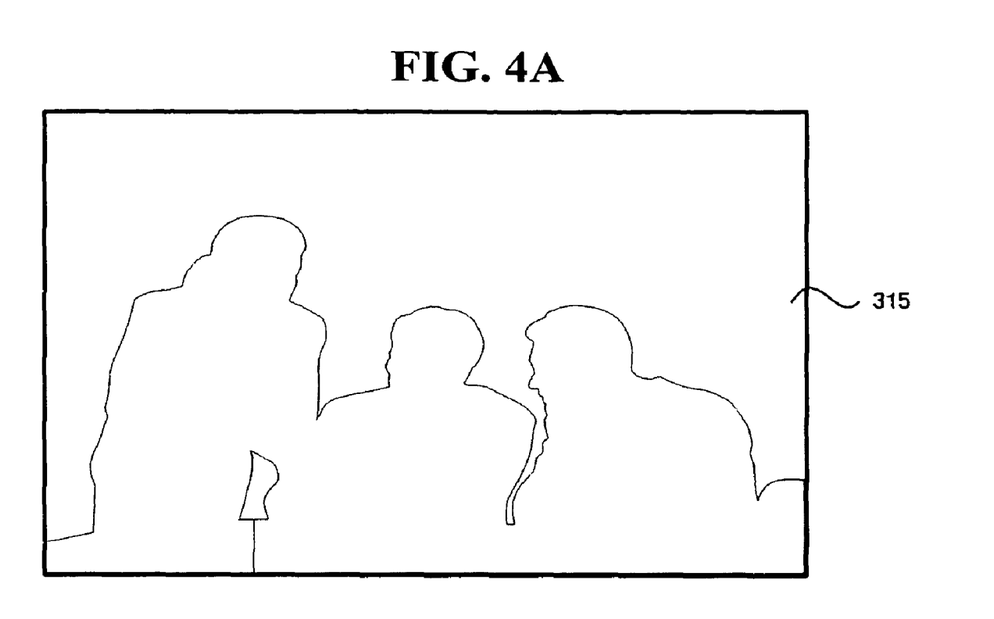
FIGS. 4A to 4F are diagrams showing examples of pictures displayed on the device for displaying images according to the exemplary embodiment of the present invention.
Figure 4B:
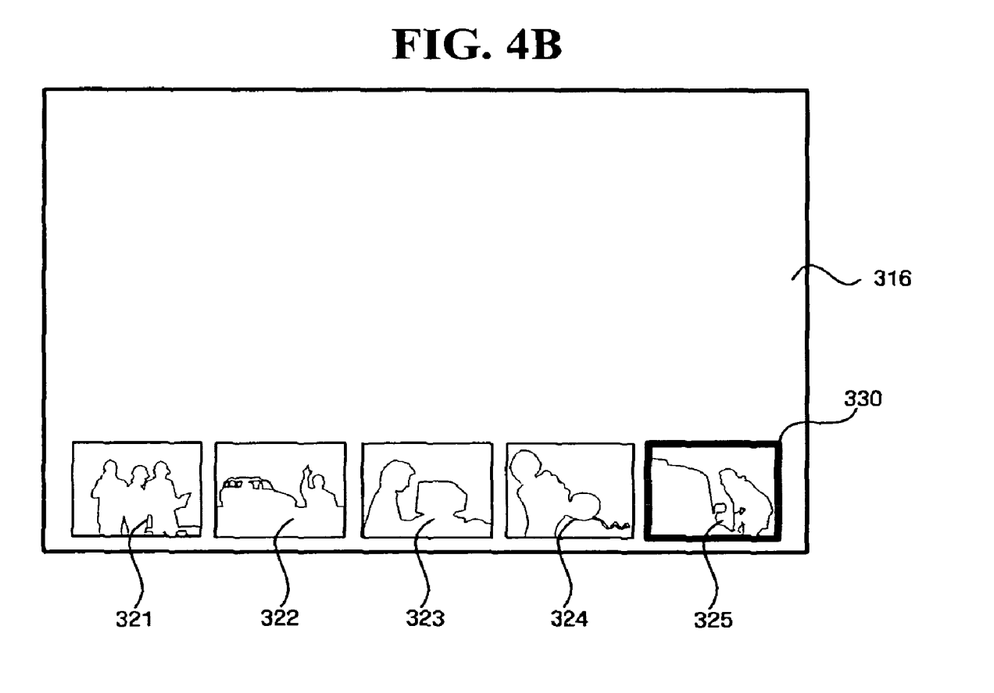
Figure 4C:
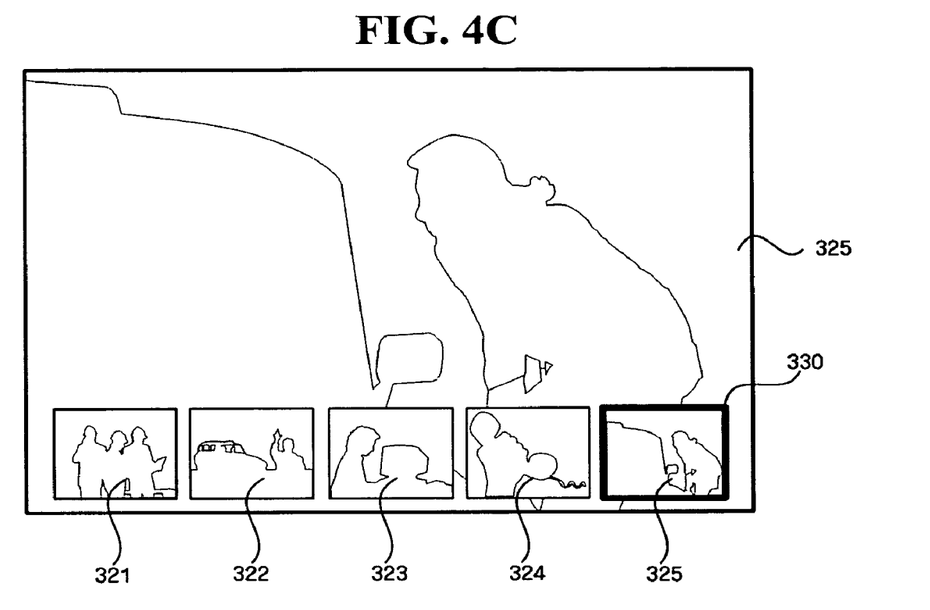
Figure 5:
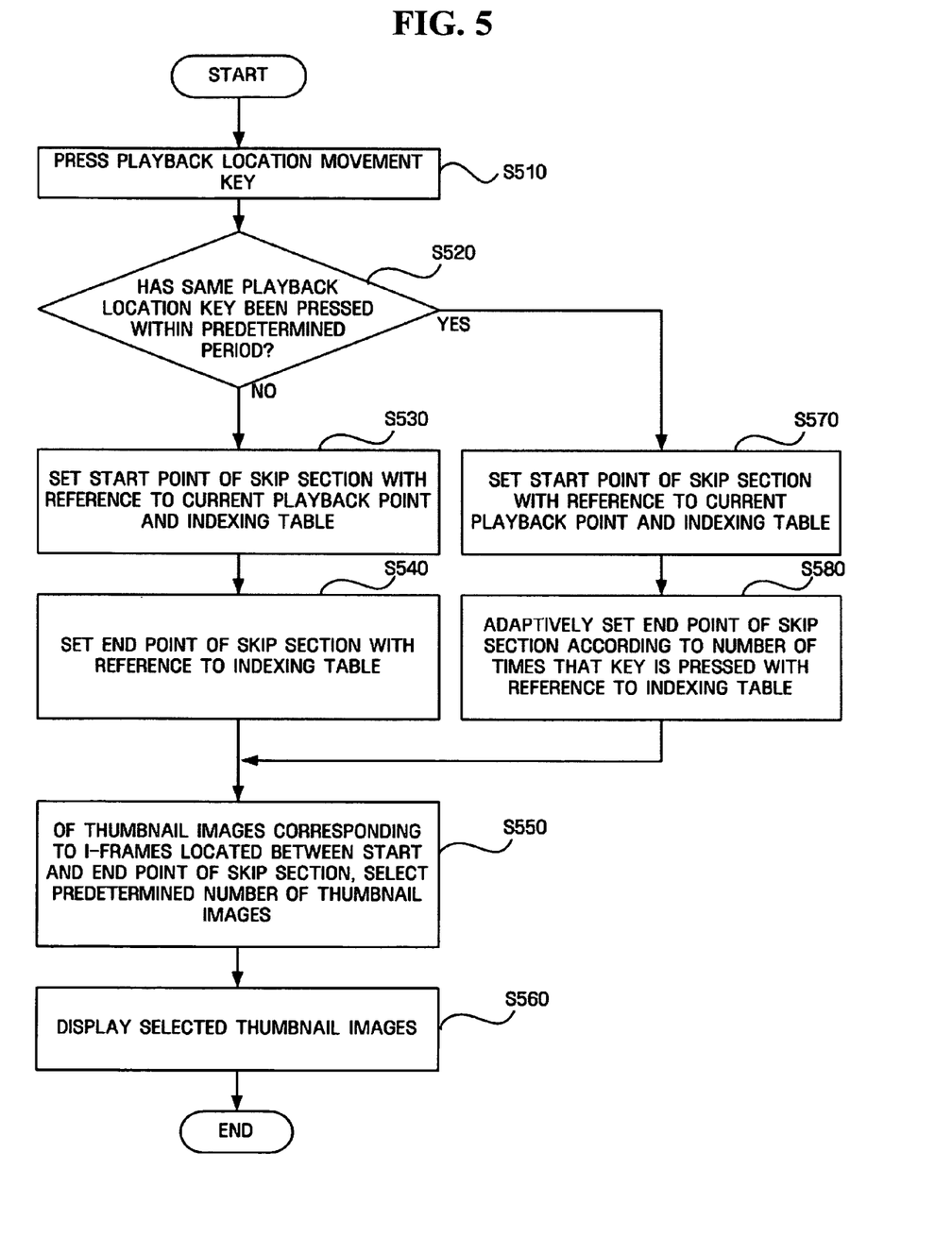
FIG. 5 is a flowchart illustrating a method of displaying images according to an exemplary embodiment of the present invention.

Meanwhile, as shown in FIG. 4A, when a playback location movement command is input while a predetermined frame is being played back at operation S510, the frame searching unit 190 determines whether the same playback location movement key is pressed again within a predetermined time, for example, three seconds, at operation S520.

If the frame searching unit 190 determines that the same playback location movement key has not been pressed again within three seconds at operation S520 ('No'), the frame searching unit 190 sets the location of an I-frame, which is closest to a frame currently being played back, for the skip start point with reference to the indexing table 230 stored in the storage unit 180, at operation S530.

Thereafter, the frame searching unit 190 sets the location of the I-frame that is closest to a frame at a location reached by skipping a predetermined skip interval, for example, by a frame section of 20, from the location of a frame currently being played back, for the skip end point, at operation S540.

In this case, it is preferred, but not necessary, that the skip start point and the skip end point be set to respective locations selected from among the locations of frames that exist in a direction conforming to a moving direction determined by the pressed playback location movement key. For example, when the first playback location movement key is pressed, the frame searching unit 190 sets frames, which are selected from among frames that are located in a forward direction with respect to the frame that is currently being played back, for the skip start point and the skip end point. In contrast, when the second playback location movement key is pressed, frames, which are selected from among frames that are located in a backward direction with respect to the frame that is currently being played back, are set for the skip start point and the skip end point.

Meanwhile, if the frame searching unit 190 determines that the same playback location movement key has been pressed again within three seconds at operation S520 ('Yes'), the frame searching unit 190 sets the location of an I-frame, which is closest to a frame currently being played back, as the skip start point at operation S570. Thereafter, the frame searching unit 190 adaptively sets the skip end point according to the number of times that the playback location movement key is pressed at S580. For example, when the same playback movement key is pressed twice, the frame searching unit 190 sets the location of the I-frame that is closest to a frame at a location reached by skipping a number of frames corresponding to twice the skip interval from the location of a frame that is currently being played back, for a skip end point. In more detail, when the skip interval is set to 20 and the playback location movement key is pressed twice in the state in which the No. 1 frame of an MPEG-2 TS stream is played back, the frame searching unit 190 sets the location of an I-frame, which is closest to a frame at a location reached by skipping 40 frames from the No. 1 frame, for the skip end point.

In this manner, when the skip start point and the skip end point are set, the thumbnail selection unit 195 selects, for example, five thumbnail images, from among frames existing within a skip section ranging from the skip start point to the skip end point, at operation S550. A process of selecting the thumbnail images is described with reference to FIG. 6.

Figure 6:
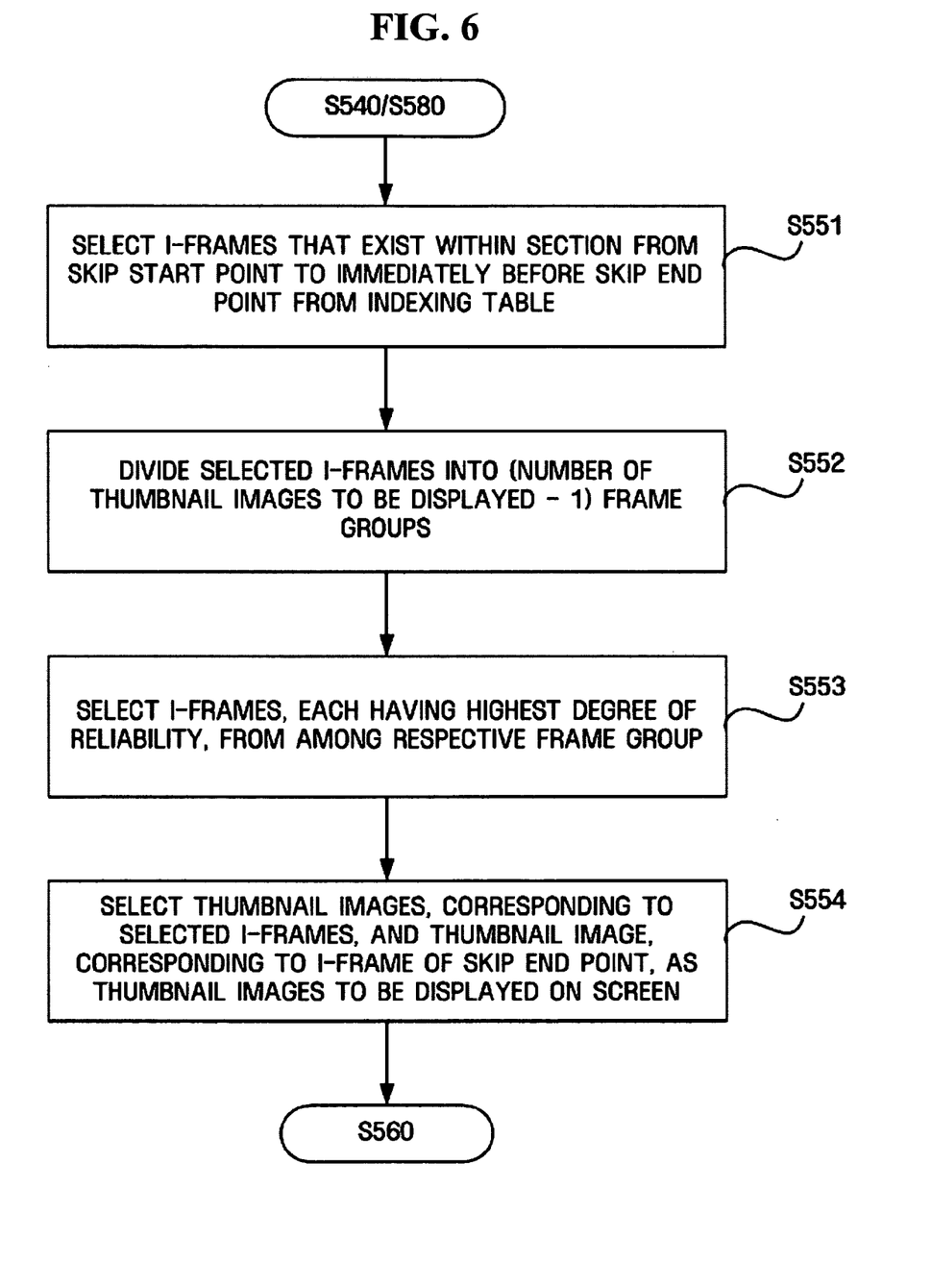
FIG. 6 is a flowchart illustrating the thumbnail image selection process of FIG. 5 in more detail according to an exemplary embodiment of the present invention.

It is preferred, but not necessary, that a thumbnail image for the frame of the skip end point frame be included in thumbnail images selected by the thumbnail selection unit 195. For this purpose, the thumbnail selection unit 195 selects frames, which exist in a section ranging from the skip start point to immediately before the skip end point, from among the frames that exist in the skip section, at operation S551. Thereafter, the thumbnail selection unit 195 divides the selected frames into four frame groups at operation S552. In this case, it is preferred that each of the frame groups include one or more frames, and that the difference between the number of frames, which are included in a frame group, and the number of frames, which are included in any of other frame groups, be equal to or less than one.

Thereafter, the thumbnail selection unit 195 selects frames, each having the highest degree of reliability, from among the respective frame group at operation S553. In this manner, when frames are selected for the respective frame groups, the thumbnail selection unit 195 provides information about the locations of the selected frames to the video processing unit 151.

The video processing unit 151 searches the indexing table 230 for information about the locations of frames, which is provided by the thumbnail selection unit 195, and disposes thumbnail images, which correspond to found location information, using a designated method. For example, the thumbnail images are disposed using the method of FIG. 3A.

The thumbnail images disposed using the designated method are displayed through the display unit 152. As a result, a screen shown in FIG. 4B is displayed. In this case, a thumbnail image corresponding to the skip end point can be marked with a focus mark. In more detail, when the first playback location movement key is pressed in the case where the thumbnail images, as shown in FIG. 4B, are disposed on the lower-end portion of a screen in a line, the focus mark may be marked on a rightmost-located thumbnail image. In contrast, when the second playback location movement key is pressed, the focus mark may be marked on a leftmost-located thumbnail image.

Meanwhile, frames which start from a frame, which belongs to a transport stream stored in the storage unit 180 and corresponds to the skip end point, are sequentially provided to the demultiplexing unit 130 by the playback unit 185.

Thereafter, after the transport stream has been divided into compressed audio data and compressed video data by the demultiplexing unit 130, the compressed audio data and the compressed video data are decoded through the audio decoder 140 and the video decoder 150, respectively. The decoded audio data is subjected to a predetermined processing by the audio processing unit 141 and is then output through the speaker 142. The decoded video data overlaps thumbnail images by the video processing unit 151 and is then displayed through the display unit 152. As a result, the screen shown in FIG. 4C is displayed.

Figure 4D:
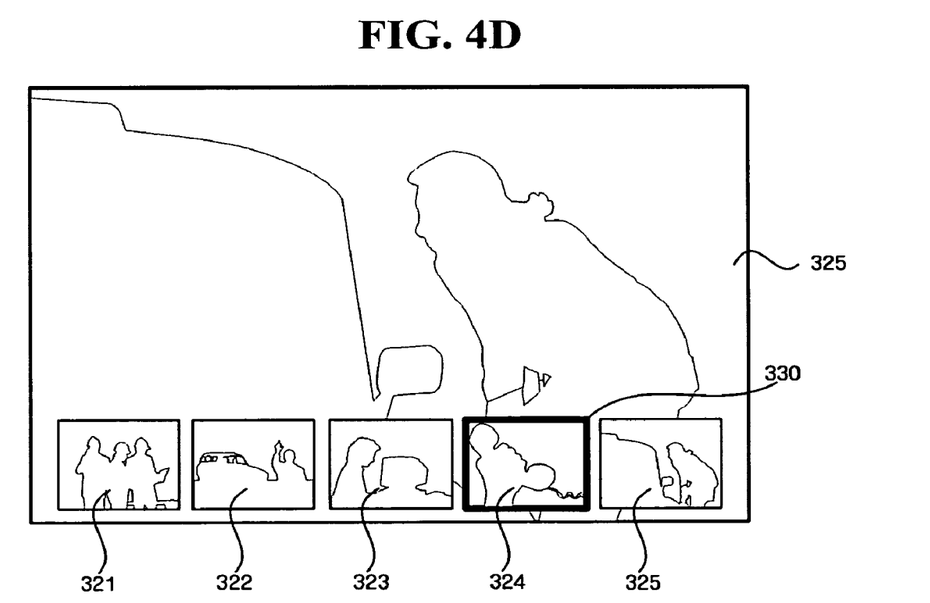

When a command for moving the focus mark is input through input unit 160 in the state in which the screen of FIG. 4C is displayed, the focus mark moves to the thumbnail image of a corresponding direction. For example, when, in the screen of FIG. 4C, the left direction key is pressed, the focus mark, as shown in FIG. 4D, moves to the fourth thumbnail image. In this case, when a selection command is input through the input unit, the frame searching unit 190 resets the location of a frame, which corresponds to a selected thumbnail image, for the skip end point with reference to the indexing table 230.

Thereafter, the thumbnail selection unit 195 selects a plurality of thumbnail images from among frames that exist in a section ranging from the skip start point to the reset skip end point frame. The plurality of thumbnail images is selected by repeating the process shown in FIG. 6. Thereafter, the video processing unit 151 displays the selected thumbnail images through the display unit 152. That is, the screen of FIG. 4E is displayed.

Figure 4E:
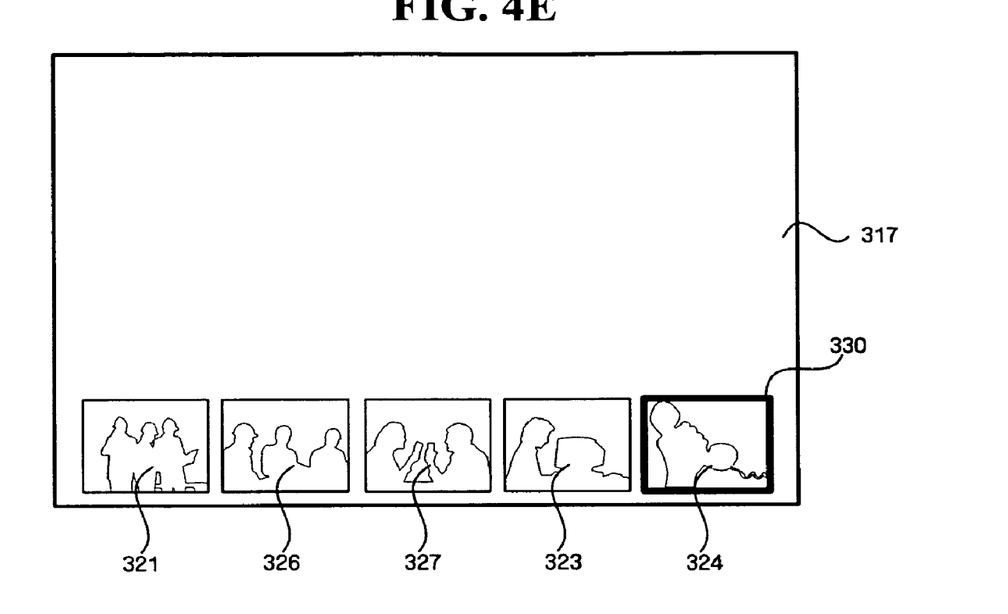
Figure 4F:
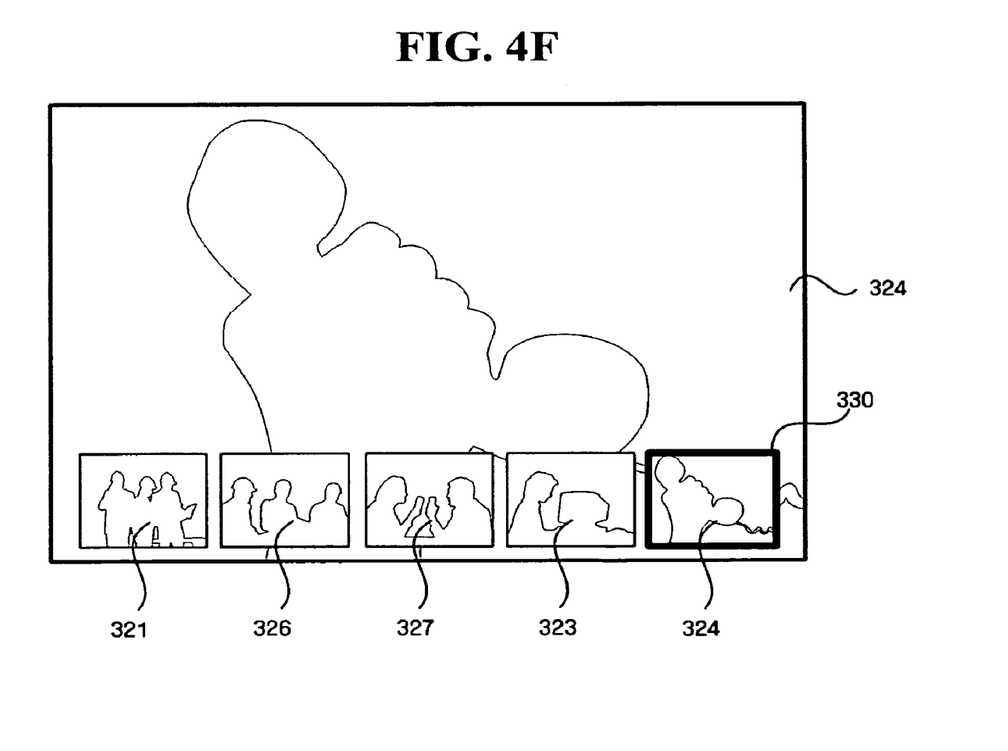

When sequential decoding from a frame corresponding to a thumbnail image selected by the user is completed after the screen of FIG. 4E has been output, images, as shown in FIG. 4F, are played back and displayed from the frame corresponding to the thumbnail image selected by the user.

In this manner, when the location of a frame, which corresponds to a thumbnail image selected by the user from among thumbnail images displayed through the display unit 152, is reset for the skip end point, the skip section is reduced. Furthermore, a plurality of thumbnail images is selected in the reduced skip section, and the details of the skip section can be displayed in more detail.

As described above, the device and the method for displaying images according to the exemplary embodiments of the present invention have the following effects:

First, when the movement of a playback location is initiated, some thumbnail images that correspond to skipped portions are displayed, so that a user can easily check the details of the skipped portions.

Second, when the movement of a playback location is initiated, the images of the skipped portions are output for the delay time that is required until the image at a moved point is output, so that visual inconvenience can be reduced.

Third, the thumbnail image of the skip end point is displayed before the playback of the image of the skip end point, so that the user can check the details of the image of the skip end point without waiting until the image is played back.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for displaying images, the device comprising:
an input unit which receives a signal for moving an image playback location along a time axis by an interval from a current playback point of images being played back;
a frame searching unit which sets a skip section ranging from a skip start point to a skip end point in response to the received signal;
a thumbnail selection unit which selects a plurality of thumbnail images existing in the skip section; and
a video processing unit which displays the selected thumbnail images.

2. The device of claim 1, wherein the image is a transport stream, and the interval is determined by frames of the transport stream.

3. The device of claim 1, wherein the frame searching unit adaptively sets the skip end point according to a number of times that the signal is input within a predetermined period.

4. The device of claim 1, wherein the selected thumbnail images comprises I-frames from the images.

5. The device of claim 1, further comprising a frame extraction unit which extracts I-frames from the images, wherein the selected thumbnail images are selected from the extracted I-frames.

6. The device of claim 5, further comprising an indexing table generation unit which generates an indexing table for the images, wherein the indexing table indicates a relationship between information about a degree of reliability, a thumbnail image, and a location of each of the extracted I-frames.

7. The device of claim 6, wherein an I-frame of the skip start point is an I-frame that belongs to the I-frames of the indexing table and has information about a location closest to the current playback point.

8. The device of claim 6, wherein an I-frame of the skip end point is an I-frame that belongs to the I-frames of the indexing table and has information about a location closest to a point that is away from the current playback point by the interval.

9. The device of claim 6, wherein the thumbnail selection unit divides the extracted I-frames into a plurality of groups, and selects an I-frame, having a highest degree of reliability, from each of the groups.

10. The device of claim 9, wherein a number of I-frames included in any one of the plurality of groups does not differ from a number of I-frames included in any other of the plurality of groups by more than one.

11. The device of claim 9, wherein if at least two I-frames in a same group among the plurality of groups has an identical degree of reliability, the thumbnail selection unit selects an I-frame from the at least two I-frames in a predetermined method.

12. The device of claim 11, wherein the predetermined method is to select from the at least two I-frames the I-frame which has information about a location closest to the skip start point or the skip end point.

13. The device of claim 1, wherein the frame searching unit resets one of the selected thumbnail images for the skip end point.

14. The device of claim 1, wherein the video processing unit is configured to indicate at least one of a thumbnail image, corresponding to the skip start point, and a thumbnail image corresponding to the skip end point among the displayed selected thumbnail images.

15. The device of claim 14, the video processing unit is further configured to change the indication of the thumbnail image corresponding to the skip end point among the displayed selected thumbnail images by a user command.

16. The device of claim 1, wherein the selected thumbnail images comprise a thumbnail image corresponding to the skip end point.

17. The device of claim 1, wherein the video processing unit is configured to cause the selected thumbnail images to overlap an image corresponding to the skip end point.

18. A method of displaying images, the method comprising:

receiving a signal for moving a image playback location along a time axis by an interval from a current playback point of images being played back;

setting a skip section ranging from a skip start point to a skip end point in response to the received signal;

selecting a plurality of thumbnail images existing in the skip section; and displaying the selected thumbnail images.

19. The method of claim 18, wherein the image is a transport stream, and the interval is determined by frames of the transport stream.

20. The method of claim 18, wherein the skip end point is adaptively set according to a number of times that the signal is input within a predetermined period.

21. The method of claim 18, wherein the selected thumbnail images comprises I-frames from the images.

22. The method of claim 18, further comprising generating an indexing table for images that are being played back, wherein the generating the indexing table comprises:

extracting I-frames from the images;

setting a degree of reliability of each of the extracted I-frames; and generating a thumbnail image corresponding to each of the extracted I-frames.

23. The method of claim 22, wherein the indexing table indicates a relationship between information about a degree of reliability, a thumbnail image, and a location of each of the extracted I-frames.

24. The method of claim 23, wherein an I-frame of the skip start point is an I-frame that belongs to the I-frames of the indexing table and has information about a location closest to the current playback point.

25. The method of claim 23, wherein an I-frame of the skip end point is an I-frame that belongs to the I-frames of the indexing table and having information about a location closest to a point that is away from the current playback point by the interval.

26. The method of claim 23, wherein the selecting a plurality of thumbnail images comprises:

dividing the extracted I-frames into a plurality of groups; and selecting an I-frame, having a highest degree of reliability, from each of the groups.

27. The method of claim 26, wherein a number of I-frames included in any one of the plurality of groups does not differ from a number of I-frames included in any other of the plurality of groups by more than one.

28. The method of claim 26, wherein, if at least two I-frames in a same group among the plurality of groups has an identical degree of reliability, the selecting the I-frame comprises selecting an I-frame from the at least two I-frames in a predetermined method.

29. The method of claim 28, wherein the predetermined method is to select from the at least two I-frames the I-frame which has information about a location closest to the skip start point or the skip end point.

30. The method of claim 18 further comprises resetting one of the selected thumbnail images for the skip end point.

31. The method of claim 18, wherein the selected thumbnail images comprise a thumbnail image corresponding to the skip end point.

32. The method of claim 18, the method further comprising causing the selected thumbnail images to overlap an image corresponding to the skip end point.

* * * * *